(12) United States Patent
Tanaka et al.

(10) Patent No.: US 12,334,751 B2
(45) Date of Patent: Jun. 17, 2025

(54) WIRELESS POWER TRANSMITTER, WIRELESS POWER RECEIVER, AND WIRELESS POWER TRANSFER SYSTEM

(71) Applicant: PANASONIC CORPORATION, Osaka (JP)

(72) Inventors: Yuki Tanaka, Tokyo (JP); Ryosuke Hasaba, Kanagawa (JP); Yoshio Koyanagi, Kanagawa (JP); Kazuki Kanai, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 346 days.

(21) Appl. No.: 17/650,137

(22) Filed: Feb. 7, 2022

(65) Prior Publication Data

US 2022/0158496 A1    May 19, 2022

Related U.S. Application Data

(63) Continuation of application No. PCT/JP2020/043744, filed on Nov. 25, 2020.

(30) Foreign Application Priority Data

Dec. 5, 2019   (JP) .................. 2019-220407

(51) Int. Cl.
  *H02J 50/23* (2016.01)
  *H02J 7/00* (2006.01)
  *H02J 50/40* (2016.01)

(52) U.S. Cl.
  CPC ............ *H02J 50/23* (2016.02); *H02J 7/0029* (2013.01); *H02J 50/40* (2016.02)

(58) Field of Classification Search
  CPC .......... H02J 50/23; H02J 7/0029; H02J 50/40; H02J 50/80
  See application file for complete search history.

(56) References Cited

U.S. PATENT DOCUMENTS 6,967,462 B1   11/2005 Landis
9,601,948 B2 *  3/2017 Kwon ..................... H02J 50/12
(Continued)

FOREIGN PATENT DOCUMENTS

JP   2012-200085 A   10/2012
JP   2016-101053 A    5/2016
(Continued)

OTHER PUBLICATIONS

International Search Report dated Feb. 16, 2021 issued in Patent Application No. PCT/JP2020/043744.
(Continued)

*Primary Examiner* — Daniel Kessie
*Assistant Examiner* — Brian K Baxter
(74) *Attorney, Agent, or Firm* — McDonald Hopkins LLC

(57) ABSTRACT

A wireless power transmitter includes an antenna that transmits a radio wave, a phase shift circuit that changes a phase of the radio wave transmitted from the antenna, a control device that controls the phase shift circuit, and a backscatter signal receiver that receives a backscatter signal. The control device executes phase optimization processing of controlling the phase shift circuit so that a strength of the backscatter signal received by the wireless power transmitter is maximized.

10 Claims, 12 Drawing Sheets

(56) References Cited

U.S. PATENT DOCUMENTS

| | | | |
|---|---|---|---|
| 2002/0141208 A1* | 10/2002 | Nanbu | H02J 7/00712 363/37 |
| 2008/0231120 A1* | 9/2008 | Jin | H02J 50/80 307/104 |
| 2010/0034238 A1* | 2/2010 | Bennett | H02J 50/40 375/E1.001 |
| 2011/0210620 A1* | 9/2011 | Shinoda | H02J 50/10 307/104 |
| 2011/0254377 A1* | 10/2011 | Wildmer | B60L 53/122 307/104 |
| 2012/0242161 A1 | 9/2012 | Kudo et al. | |
| 2013/0260676 A1* | 10/2013 | Singh | H04B 5/45 307/104 |
| 2014/0015344 A1* | 1/2014 | Mohamadi | H02J 50/27 307/149 |
| 2014/0117771 A1* | 5/2014 | Kwon | H02J 50/12 307/104 |
| 2015/0091706 A1* | 4/2015 | Chemishkian | G06K 7/10158 340/10.34 |
| 2015/0108847 A1* | 4/2015 | Taylor | H02J 50/12 307/104 |
| 2015/0333537 A1 | 11/2015 | Uchida | |
| 2016/0126753 A1* | 5/2016 | Wight | H02J 50/90 307/104 |
| 2016/0190816 A1* | 6/2016 | Rehm | H02J 50/12 307/104 |
| 2016/0322830 A1* | 11/2016 | Ramorini | H02J 50/001 |
| 2017/0116443 A1 | 4/2017 | Bolic et al. | |
| 2017/0141818 A1 | 5/2017 | Umeda et al. | |
| 2017/0149294 A1 | 5/2017 | Wight et al. | |
| 2017/0294941 A1* | 10/2017 | Long | H04B 5/79 |
| 2018/0085593 A1* | 3/2018 | Fayram | H02J 50/20 |
| 2018/0358906 A1* | 12/2018 | Hatakeyama | H02J 7/00 |
| 2019/0181691 A1 | 6/2019 | Wight et al. | |
| 2019/0184842 A1* | 6/2019 | Waters | H02J 50/10 |
| 2019/0214855 A1* | 7/2019 | Abiri | H02J 50/20 |
| 2020/0099257 A1* | 3/2020 | Qiu | H02J 7/00712 |
| 2020/0155843 A1* | 5/2020 | Yeh | H02J 50/20 |
| 2020/0266673 A1* | 8/2020 | Reynolds | H02J 50/20 |
| 2020/0366138 A1* | 11/2020 | Janjic | H02J 50/90 |
| 2021/0175750 A1* | 6/2021 | Meyer | H02J 50/12 |
| 2021/0336489 A1* | 10/2021 | Lee | H02J 50/20 |
| 2022/0190647 A1* | 6/2022 | Hosoi | H02M 3/01 |
| 2023/0028864 A1* | 1/2023 | Fan | H02J 50/23 |
| 2023/0336123 A1* | 10/2023 | Plouchart | H03L 7/099 |

FOREIGN PATENT DOCUMENTS

| | | |
|---|---|---|
| JP | 2017-093223 A | 5/2017 |
| JP | 2018-501754 A | 1/2018 |
| WO | 2014-118919 A1 | 8/2014 |
| WO | 2019/140107 A1 | 7/2019 |

OTHER PUBLICATIONS

Written Opinion dated Feb. 16, 2021 issued in Patent Application No. PCT/JP2020/043744.

Takanori Yamazoe, "IC tag, Keywords you should know. (3rd)", on Mar. 1, 2006, ITE Journal, vol. 60, No. 3, pp.326~328 (2006), [Searched on Oct. 7, 2020, URL:https://www.jstage.jst.go.jp/article/itej/60/3/60_3_326/_pdf/-char/ia.

* cited by examiner

WIRELESS POWER TRANSMITTER, WIRELESS POWER RECEIVER, AND WIRELESS POWER TRANSFER SYSTEM

CROSS-REFERENCE TO RELATED APPLICATIONS

This is a continuation of International Application No. PCT/JP2020/043744 filed on Nov. 25, 2020, and claims priority from Japanese Patent Application No. 2019-220407 filed on Dec. 5, 2019, the entire content of which is incorporated herein by reference.

TECHNICAL FIELD

The present disclosure relates to a wireless power transmitter, a wireless power receiver, and a wireless power transfer system.

BACKGROUND ART

JP-A-2017-093223 discloses a power receiving device including a power receiving unit, a power storage unit, and a signal transmitting unit. The power receiving unit wirelessly receives power from a power transmitting device. The power storage unit stores the power received by the power receiving unit. The signal transmitting unit transmits a detection signal. The signal transmitting unit is independent of a power system of the power storage unit. JP-A-2017-093223 discloses that in the power receiving device, the signal transmitting unit transmits, as the detection signal, a reflected wave obtained by reflecting a radio wave from the power transmitting device.

It is known that received power in a wireless power receiver can be improved by optimizing phases of radio waves oscillated from a plurality of wireless power transmitters. However, in order to optimize the phases, it is necessary to know a value of a phase delay between the wireless power transmitter and the wireless power receiver. In order to know the phase delay, it is necessary to establish synchronization between the wireless power transmitter and the wireless power receiver. It is difficult to perform the synchronization wirelessly from a viewpoint of power consumption, noise, and the like.

SUMMARY OF INVENTION

The present disclosure has been made in view of the above problems. An object of the present disclosure is to provide a wireless power transmitter that improves received power with low power consumption.

According to an aspect of the present disclosure, there is provided a wireless power transmitter including: an antenna configured to transmit a radio wave; a phase shift circuit configured to change a phase of the radio wave transmitted from the antenna; a control device configured to control the phase shift circuit; and a backscatter signal receiver configured to receive a backscatter signal, in which the control device is configured to execute phase optimization processing of controlling the phase shift circuit so that a strength of the backscatter signal received by the wireless power transmitter is maximized.

According to an another aspect of the present disclosure, there is provided a wireless power receiver including: an antenna configured to receive a radio wave; a rectifier circuit configured to rectify a signal received by the antenna; a backflow current prevention circuit; a backscatter modulation circuit; a power storage circuit; and a load, in which, the backscatter modulation circuit has an impedance modulation element, the antenna is connected to an input of the rectifier circuit; an output of the rectifier circuit is connected to the impedance modulation element; and one end of the backflow current prevention circuit is connected to the impedance modulation element, and the other end of the backflow current prevention circuit is connected to the power storage circuit and the load.

According to a further another aspect of the present disclosure, there is provided a wireless power transfer system including: two or more wireless power transmitters; and a wireless power receiver, in which, each of the two or more wireless power transmitters includes: an antenna configured to transmit a radio wave; a phase shift circuit configured to change a phase of the radio wave transmitted from the antenna; a control device configured to control the phase shift circuit; and a backscatter signal receiver configured to receive a backscatter signal; and in which the wireless power receiver includes: an antenna configured to receive the radio wave; a rectifier circuit configured to rectify a signal received by the antenna; a backscatter modulation circuit; a power storage circuit; and a load; in which the antenna of the wireless power receiver is configured to output the backscatter signal modulated by the backscatter modulation circuit according to the received radio wave; and in which the control device of each of the two or more wireless power transmitters is configured to execute phase optimization processing of controlling the corresponding phase shift circuit so that a strength of the backscatter signal received by the wireless power transmitter is maximized.

According to the present disclosure, it is possible to provide a wireless power transmitter that improves received power with low power consumption.

DESCRIPTION OF EMBODIMENTS

Hereinafter, a detailed description will be given with reference to the drawings as appropriate. The accompanying drawings and the following description are provided for a thorough understanding of the present disclosure by those skilled in the art, and are not intended to limit a subject matter recited in the claims.

Background to Present Disclosure

In a wireless sensor network or a wearable terminal, an energy harvest element such as a solar cell is used as a power source in addition to a primary battery such as a button battery and a secondary battery such as a lithium ion battery. Here, when the battery is used, it is necessary to exchange or charge the battery. On the other hand, although the energy harvest element such as the solar cell does not require battery exchange, the energy harvest element is high in cost and supply power depends on environment. The above problems related to the power supply are a barrier to spread of IoT devices.

As a power supply unit for a terminal such as the IoT device, a microwave wireless power supply technique capable of wirelessly supplying power over a long distance is researched and developed. However, since a microwave is attenuated in inverse proportion to the square of the distance, it is difficult to supply the power with high efficiency. In addition, since most of the microwaves are used for communication, use of the microwaves as a wireless power supply unit may affect existing communication devices. Further, when a high-power microwave is used to supply high power, it cannot be denied that the high-power microwave may adversely affect a human body, a living body, and the like. Therefore, it is difficult to apply the existing wireless power supply technique. Therefore, a technique capable of supplying a large amount of power with smaller output is desired.

(Distributed WPT)

Figure 1:
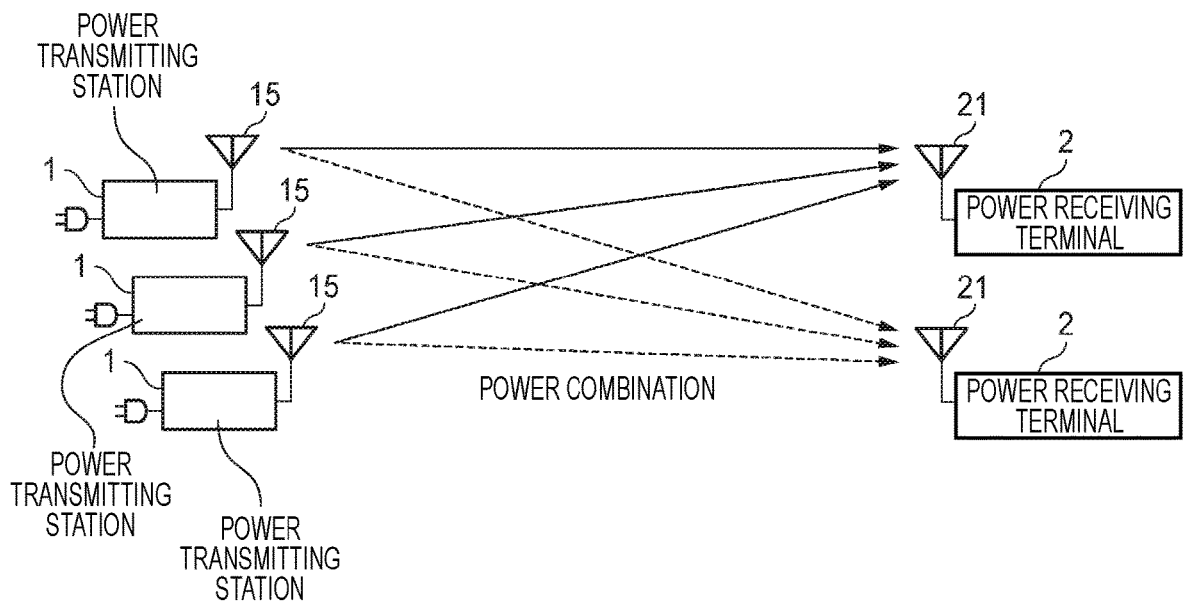
FIG. 1 is a schematic diagram of a distributed WPT.

At present, distributed wireless power transfer/transmission (WPT) in which a plurality of power transmitting stations that supply the power are distributed is studied. FIG. 1 is a schematic diagram of the distributed WPT.

In the distributed WPT, a plurality of low-gain and low-output power transmitting stations (wireless power transmitter 1) are provided. The power transmitting stations are operated in cooperation with each other, thereby implementing power transfer with high efficiency and high degree of freedom. For example, several tens to several thousands of power transmitting stations shown in FIG. 1 are provided per system. The power from the power transmitting stations is combined, and combined power is supplied to a power receiving terminal (wireless power receiver 2). The power receiving terminal may be, for example, an IoT terminal or a beacon.

Advantages of the distributed WPT are as follows. First, as an advantage of a power transmitting station, a low-gain antenna or a low-output power amplifier (PA) can be used. Therefore, the power transmitting station can be made small in size and low in cost, and it is also relatively easy to protect the human body. Since transmission output is small, it is easy to take measures against heat dissipation even when the power transmitting station is small in size. Due to the small size and low cost, it is possible to incorporate the power transmitting stations into an existing lighting fixture or home electric appliance.

Advantages of the power receiving terminal are as follows. Since the power arrives from a plurality of directions, a low-directional power receiving antenna can be used. Since the low-directional antenna is small in size, the low-directional antenna can be mounted on various small devices. Since a benefit of a transmission diversity effect can be obtained, it is possible to receive the power with a high power supply time rate.

Advantages of a system including the power transmitting station and the power receiving terminal are as follows. Since power density on the power transmitting station side is low, the effect on the human body is essentially small. Since there are a plurality of power transmitting stations, even when a small number of power transmitting stations are turned OFF due to human body shielding or the like, efficiency deterioration of the power transfer is small. A position of the power receiving terminal can be estimated from position information and received power information of the plurality of power transmitting stations. The power can be supplied to the plurality of power receiving terminals at the same time.

(Combination of Power)

When there are the plurality of power transmitting stations, the power receiving terminal that receives radio waves oscillated by each power transmitting station combines the received radio waves and receives the combined radio waves. Here, it is known that when frequencies of the radio waves transmitted by respective power transmitting stations are equal to each other and the phases of the radio waves transmitted from the respective power transmitting stations are received in the same phase by the power receiving antenna (phase difference is 0), the power received by the power receiving terminal is maximized. That is, in order to increase the efficiency of wireless power supply, it is necessary to optimize the frequencies and the phases of the radio waves transmitted by the respective power transmitting stations.

As a method for optimizing the phase of the radio waves transmitted by each power transmitting station, a method using the power received by the power receiving terminal can be considered. In the method, the phases on the power transmitting station side is swept, and the phases of the radio waves transmitted by the power transmitting station when the power received by the power receiving terminal is maximum is determined as an optimum phase. Although the method has an advantage that it can be implemented by a simple system, it is necessary to feed back the power received by the power receiving terminal to the power transmitting station.

However, on the premise of the wireless power supply to the power receiving terminal such as the IoT device, the power transmitting station and the power receiving terminal are often located away from each other. Therefore, there is a problem in how to feed back the power received by the power receiving terminal to the power transmitting station.

Therefore, in the embodiment of the present disclosure, the above-described problem is solved by utilizing a backscatter signal reflected from the power receiving terminal.

(Backscatter)

Figure 2:
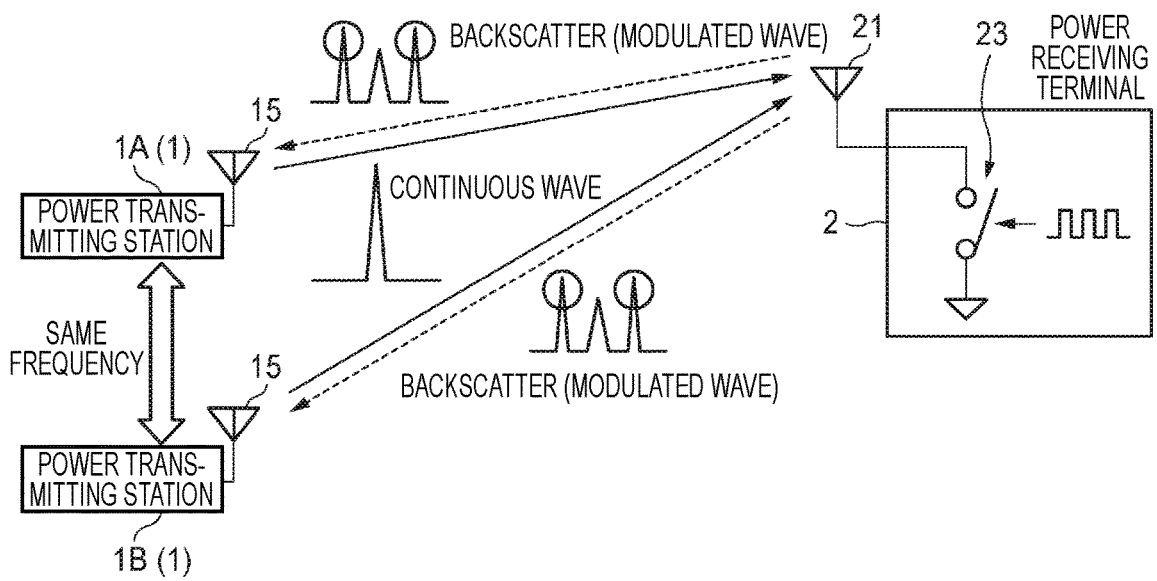
FIG. 2 is a conceptual diagram showing a mechanism of backscatter.

FIG. 2 is a conceptual diagram showing a mechanism of the backscatter. A plurality of power transmitting stations 1A and 1B transmit radio waves (continuous waves) at the same frequency (for example, 920 MHz). The power receiving terminal 2 receives the radio waves (continuous waves) by an antenna 21, whereas reflection from the antenna 21 occurs. The backscatter modulation circuit 23 included in the power receiving terminal 2 modulates the reflection from the antenna 21 to generate the backscatter (modulated wave). In the illustrated example, the backscatter modulation circuit 23 operating as a mixer (multiplier) modulates the radio wave of 920 MHz incident on the power receiving terminal 2 by 32 kHz. As a result, the reflection returning from the antenna 21 of the power receiving terminal 2 to the power transmitting stations 1A and 1B includes a modulated wave of 920 MHz−32 kHz and a modulated wave of 920 MHz+32 kHz.

Since the backscatter modulation circuit 23 functions as the mixer (multiplier), a substantially proportional relationship is established between the power received by the power receiving terminal 2 (received power) and a strength of the backscatter signal. Therefore, the power transmitting stations 1A and 1B can receive the backscatter signal and estimate the strength of the received power from the strength of the backscatter signal. More specifically, in order to maximize the received power, the power transmitting stations 1A and 1B adjust the phase of the radio waves (for example, the microwave of 920 MHz) transmitted by the power transmitting station to a phase at which the strength of the backscatter signal is maximized. Since the received power of the power receiving terminal 2 is also maximized when the strength of the backscatter signal is maximized, the phase after the adjustment as described above is the optimum phase. The wireless power transmitter according to the present disclosure increases the received power while reducing the power consumption by utilizing characteristics of the backscatter signal in this way.

(System Block Diagram)

Figure 3:
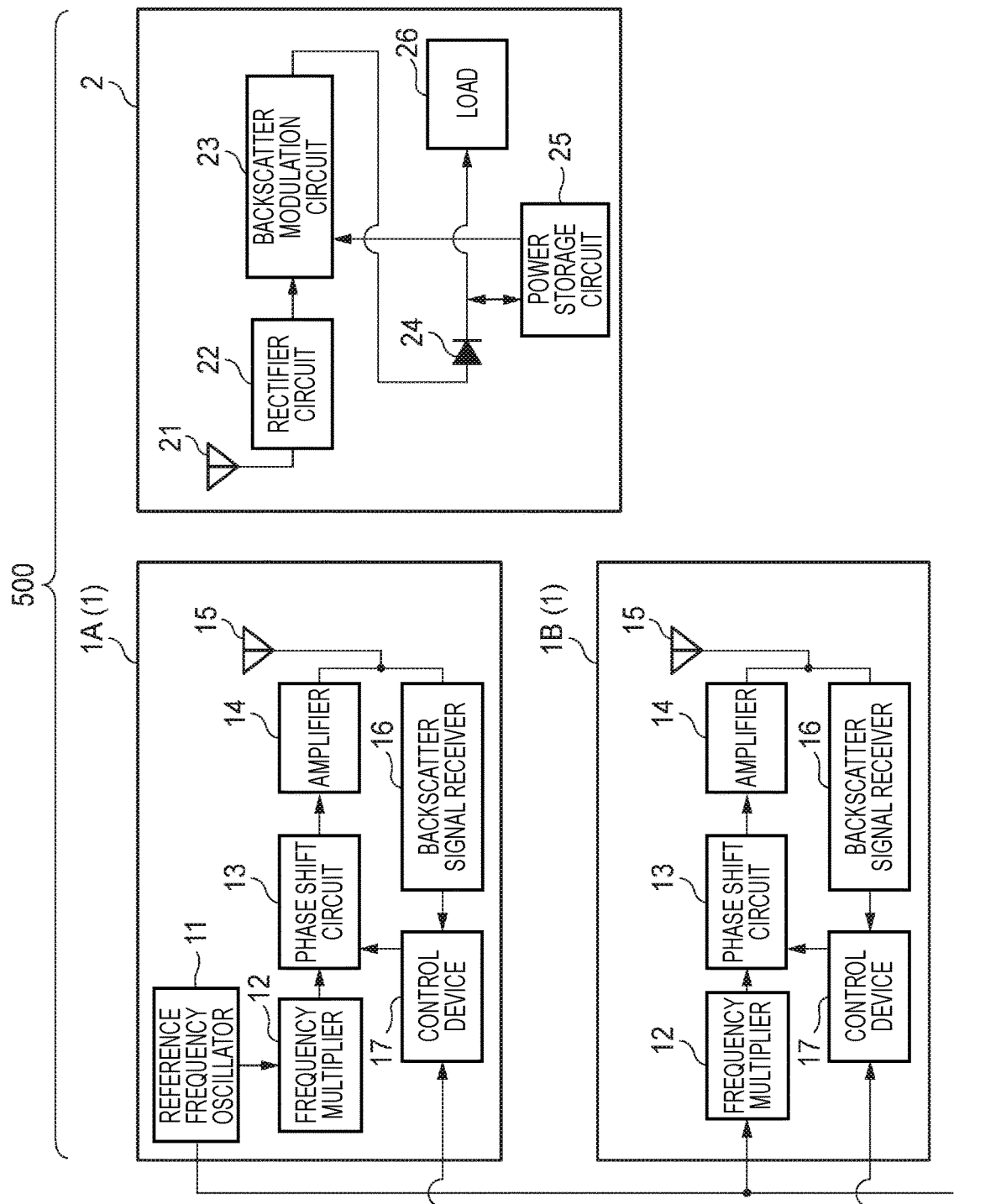
FIG. 3 is a system block diagram showing a wireless power transfer system 500 according to the present disclosure.

FIG. 3 is a system block diagram showing the wireless power transfer system 500 according to the present disclosure. The wireless power transfer system 500 includes two or more wireless power transmitters 1A and 1B and one or more wireless power receivers 2. The two or more wireless power transmitters 1A and 1B may be connected to each other in a wired or wireless manner.

A large number of wireless power transmitters 1 may be disposed in the same space. For example, 256 units of wireless power transmitters 1 may be disposed in a space of 30 m×30 m. One wireless power transmitter 1 includes an antenna 15, a reference frequency oscillator 11, a frequency multiplier 12, a phase shift circuit 13, an amplifier 14, a backscatter signal receiver 16, and a control device 17. The antenna 15 may be a circularly polarized antenna, or may be another type of antenna. When the circularly polarized antenna is used as the antenna 15, polarization matching loss can be reduced even when the antenna 21 is rotated.

The wireless power transmitter 1 transmits the radio waves from the antenna 15. The radio wave may be, for example, the microwave (continuous wave) having a transmission frequency of 920 MHz, and is received by the wireless power receiver 2 to be described later. Hereinafter, for convenience of description, it is assumed that the radio wave transmitted from the antenna 15 is the microwave having the transmission frequency of 920 MHz. However, the above is merely an example, and the transmission frequency may be a value other than 920 MHz.

In order to generate the radio wave of 920 MHz described above, the reference frequency oscillator 11 oscillates a reference frequency signal. The reference frequency may be, for example, 10 MHz, and is lower than the frequency of the radio wave transmitted by the antenna 15. However, the reference frequency may be a value other than 10 MHz.

The 10 MHz signal oscillated by the reference frequency oscillator 11 is multiplied by the frequency multiplier 12. A specific example of the frequency multiplier 12 is a PLL circuit. As a result of the multiplication, the signal having the frequency of 920 MHz is generated and input to the phase shift circuit 13 to be described later.

The phase shift circuit 13 changes the phase of the signal input from the frequency multiplier 12 under the control of the control device 17. In particular, under the control of the control device 17, the phase shift circuit 13 changes the phase of the signal input from the frequency multiplier 12 to adjust the phase of the radio wave transmitted from the antenna 15 to the optimum phase (phase optimization). Phase optimization processing will be described later with reference to FIGS. 6 to 10.

The 920 MHz signal input from the phase shift circuit 13 is amplified by the amplifier 14 and transmitted from the antenna 15 to the wireless power receiver 2.

Here, when the radio wave is transmitted from the antenna 15 to the wireless power receiver 2, the reflection occurs at the antenna 21 of the wireless power receiver 2 to be described later (see FIG. 2). The reflection is modulated by the backscatter modulation circuit 23, which will be described later, to obtain the backscatter signal. The backscatter signal receiver 16 included in the wireless power transmitter 1 receives the backscatter signal.

The control device 17 may include, for example, a central processing unit (CPU), or a field programmable gate array (FPGA). However, a control unit included in the control device 17 is not limited thereto. The control device 17 controls at least the phase shift circuit 13. The control device 17 may integrally control various devices included in the wireless power transmitter 1. The control device 17 acquires the backscatter signal from the backscatter signal receiver 16, controls the phase shift circuit 13 based on the signal, and adjusts the phase of the radio wave transmitted from the antenna 15 to the optimum phase (phase optimization). Specific details of the phase optimization processing will be described later.

The basic configuration of the wireless power transmitter 1 is as described above. Here, technical significance of multiplying the reference frequency signal by the frequency multiplier 12 will be described. When it is desired to synchronize power transmission frequencies from a plurality of frequencies, it is common in a phased array antenna or the like to distribute, amplify, and transmit a radio frequency (RF). However, radio frequency (RF) transfer has a large propagation loss, and wiring needs to be a coaxial cable, which is high in cost. On the other hand, in the wireless power transfer system 500 according to the present disclosure, as described above, a low frequency (for example, 10 MHz) at which the wiring is easy is used as the reference frequency. Accordingly, the wiring can be implemented at low cost, and a final transmission frequency (for example, 920 MHz) can be precisely synchronized.

Here, the wireless power transmitter 1B in FIG. 3 does not include the reference frequency oscillator 11. This indicates that all the wireless power transmitters do not necessarily include the reference frequency oscillator 11. As illustrated, the plurality of wireless power transmitters 1A and 1B may be connected to each other in the wired or wireless manner, and the reference frequency signal generated by the reference frequency oscillator 11 of one wireless power transmitter (1A in the example of the drawing) can be shared with another wireless power transmitter (1B in the example of the drawing). That is, the wiring extending from the reference frequency oscillator 11 to the outside shown in FIG. 3 can be interpreted as an output unit that outputs the signal oscillated by the reference frequency oscillator 11 to the outside. The shared reference frequency signal is multiplied by the frequency multiplier 12 included in each wireless power transmitter. That is, the frequency multiplier 12 included in each wireless power transmitter can be interpreted as an input unit of the reference frequency generated by another wireless power transmitter.

On the other hand, each wireless power transmitter may include the reference frequency oscillator 11 and separately oscillate the reference frequency signal. Frequency synchronization can be performed by oscillating the signal of a fundamental frequency of a sufficiently equal frequency (for example, 10 MHz) in each wireless power transmitter 1.

In the above-described example, the wireless power transmitter 1 receives the backscatter signal via the antenna 15. However, the backscatter signal may not be acquired via the antenna. For example, one of a plurality of wireless power transmitters 1 present in the wireless power transfer system 500 (for example, the wireless power transmitter 1A) may receive the backscatter signal via the antenna 15, and the backscatter signal may be shared with another wireless power transmitter 1 (for example, the wireless power transmitter 1B) in the wired or wireless manner. In either case, the control device 17 can acquire the backscatter signal. Therefore, at least one of the wireless power transmitters 1 may include the backscatter signal receiver 16, and other wireless power transmitters 1 may not include the backscatter signal receiver 16.

(Configuration Example of Wireless Power Receiver 2)

Next, a configuration example of the wireless power receiver 2 will be described. The wireless power receiver 2 includes the antenna 21 that receives the radio waves, a rectifier circuit 22 that rectifies a signal received by the antenna 21, the backscatter modulation circuit 23, a diode 24 that is an example of a backflow current prevention circuit, a power storage circuit 25, and a load 26. The antenna 21 is connected to an input of the rectifier circuit 22. One end of the diode 24 is connected to the backscatter modulation circuit 23. The other end of the diode 24 is connected to the power storage circuit 25 and the load 26. The backscatter modulation circuit 23 is connected between the rectifier circuit 22 and the diode 24.

The radio wave transmitted by the wireless power transmitter 1 is received by the antenna 21 and DC-converted by the rectifier circuit 22. The power is temporarily stored in the power storage circuit 25 and supplied to the load 26 from the power storage circuit 25. The configuration related to the basic wireless power supply of the wireless power receiver 2 is described above. The backscatter modulation circuit 23 modulates the reflection from the antenna 21 that receives the radio wave (see FIG. 2). The diode 24 is an example of the backflow current prevention circuit, and separates the rectifier circuit 22 and the power storage circuit 25 from each other. The backscatter modulation circuit 23 and the diode 24 will be described later in detail with reference to FIG. 4.

(Configuration Example of Wireless Power Receiver 2)

Figure 4:
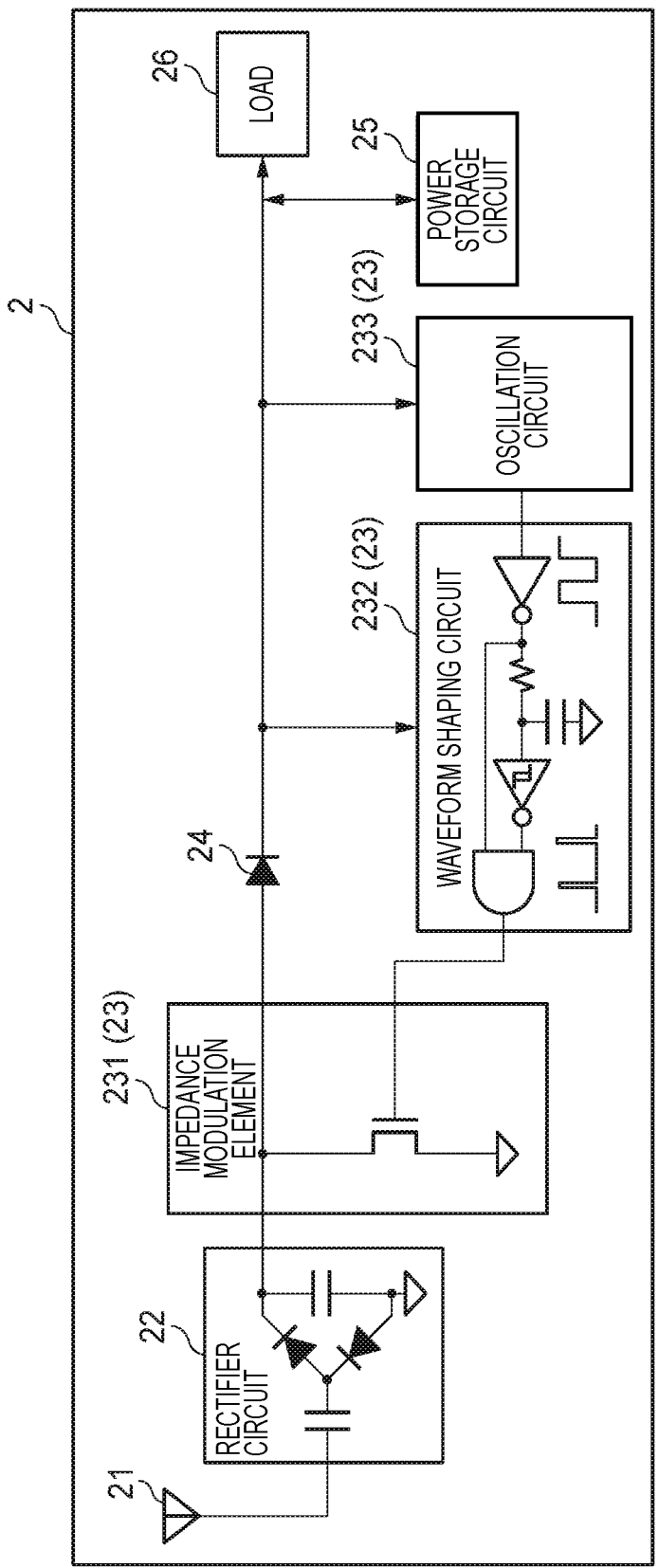
FIG. 4 is a circuit diagram showing a configuration example of a wireless power receiver 2 including a backscatter modulation circuit 23.

FIG. 4 is a circuit diagram showing a configuration example of the wireless power receiver 2 including the backscatter modulation circuit 23. Since the arrangement of each component in the circuit diagram is substantially the same as that shown in FIG. 3, the same components as those shown in FIG. 3 are denoted by the same reference numerals, description thereof will be simplified or omitted, and differences will be described.

The backscatter modulation circuit 23 typically includes an impedance modulation element 231 using a semiconductor switch and a variable capacitance diode, an oscillation circuit 233, and a waveform shaping circuit 232. The impedance modulation element 231 is connected between the rectifier circuit 22 and the diode 24.

The waveform shaping circuit 232 shapes a waveform of a clock input from the oscillation circuit 233 into a waveform having a lower duty ratio, and inputs the waveform to the impedance modulation element.

Here, the technical significance of providing the impedance modulation element 231 at a subsequent stage of the rectifier circuit 22 will be described. In order to generate the backscatter signal, a method of modulating an impedance of an element connected to the antenna (antenna 21) by an RF switch (high frequency switch) or the like is generally used. However, since the RF switch has a large loss and high in cost, the cost of the power receiving terminal (wireless power receiver 2) is increased. On the other hand, in the wireless power receiver 2 according to the present disclosure, a low frequency switch (impedance modulation element 231) is connected to the subsequent stage of the rectifier circuit 22, that is, at a position after the DC conversion is performed, and the modulation is performed by switching the low frequency switch. Accordingly, the cost of the wireless power receiver 2 can be reduced. The wireless power receiver 2 may be the IoT device, which is advantageous in that a large number of IoT devices can be manufactured at low cost.

Next, the technical significance of providing the diode 24 at the illustrated position, that is, at the subsequent stage of a low frequency switch element (impedance modulation element 231) will be described. As illustrated, the power storage circuit 25 is present at the subsequent stage of the rectifier circuit 22. When switching is performed by the low frequency switch element (impedance modulation element 231), the power stored in the power storage circuit 25 leaks out at the time, and power loss occurs. Therefore, the rectifier circuit 22 and the power storage circuit 25 are separated by the diode 24, and the low frequency switch (impedance modulation element 231) is provided on the rectifier circuit 22 side as viewed from the diode 24, thereby reducing the power loss. As a result, the wireless power receiver 2 with reduced power consumption can emit a larger backscatter signal for a longer period of time.

Next, the technical significance of providing the waveform shaping circuit 232 between the oscillation circuit 233 and the impedance modulation element 231 will be described. As described above, even if the diode 24 for preventing the power loss is provided, the power loss is large if an ON state continues for a long period of time in the switching of the impedance modulation element 231 based on the oscillation circuit 233. Therefore, it is desirable that the waveform of the wave applied from the oscillation circuit 233 to the impedance modulation element 231 has a lower duty ratio. Therefore, the waveform shaping circuit 232 that controls the duty ratio of the switching is provided between the oscillation circuit 233 and the impedance modulation element 231 to reduce the power loss.

Since the wireless power receiver 2 according to the present disclosure has the above-described configuration, the wireless power receiver 2 generates a large backscatter signal while minimizing the power loss, and improves an S/N ratio of the system.

(Modification of Wireless Power Receiver 2)

Figure 5:
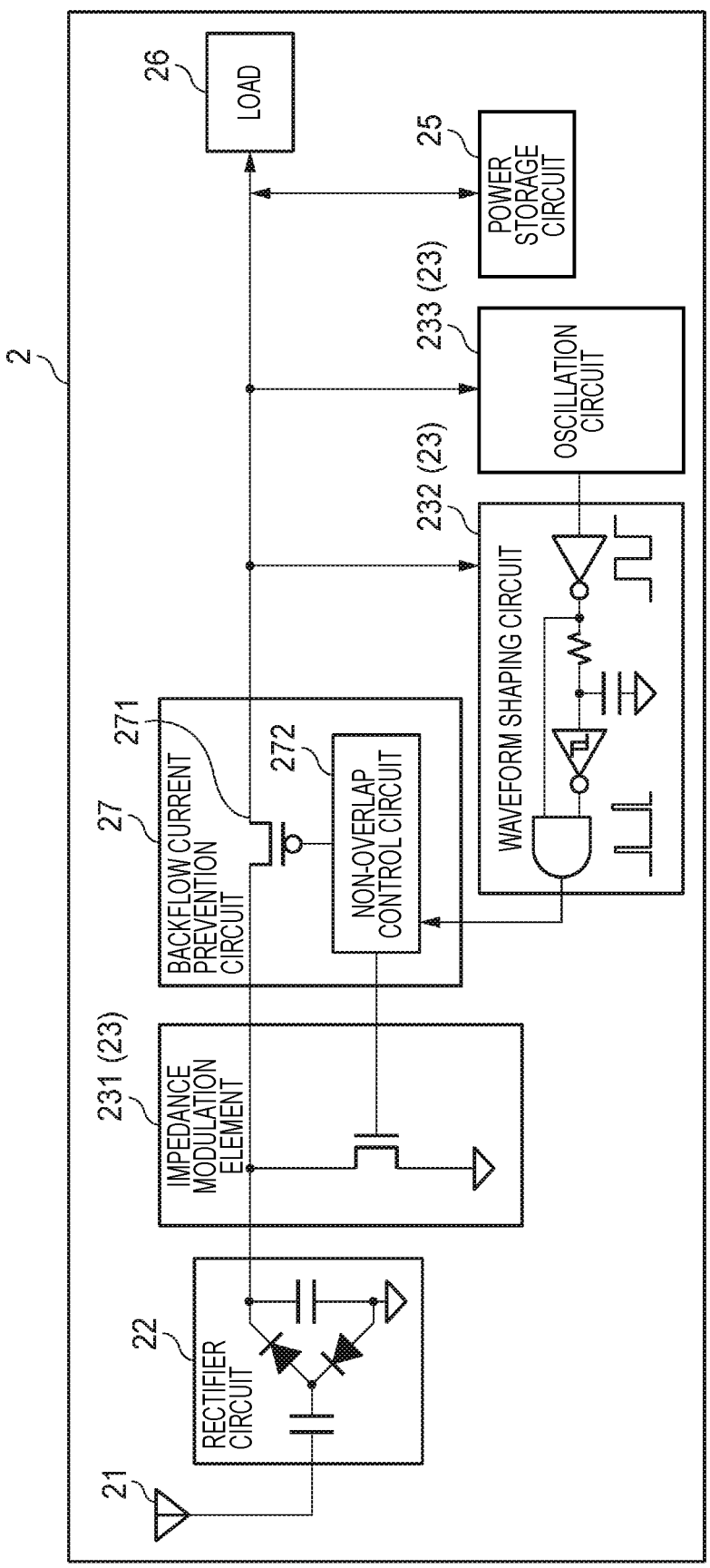
FIG. 5 is a circuit diagram showing a modification of the wireless power receiver 2 including the backscatter modulation circuit 23.

FIG. 5 is a circuit diagram showing a modification of the wireless power receiver 2 including the backscatter modulation circuit 23. A circuit configuration shown in FIG. 4 and the circuit configuration shown in FIG. 5 are substantially the same. Therefore, the description of the portions common to both of the circuit configurations will be simplified or omitted, and the differences will be described.

In the circuit configuration shown in FIG. 4, the diode 24 is disposed at the subsequent stage of the impedance modulation element 231. On the other hand, in the circuit configuration shown in FIG. 5, a backflow current prevention circuit 27 having, for example, a configuration as illustrated is disposed at the subsequent stage of the impedance modulation element 231.

The backflow current prevention circuit 27 is configured by a Pch metal oxide semiconductor field effect transistor (MOSFET) or the like, and is disposed so that the switch of the backflow current prevention circuit 27 is turned OFF when the impedance modulation element 231 has a low impedance. Accordingly, it is possible to prevent the backflow of the power.

When the two MOSFETs shown in FIG. 5 are simultaneously in the ON state, a through current is generated. In order to avoid the generation of the through current, a non-overlap control circuit 272 may be inserted between the MOSFET in the backflow current prevention circuit 27 and the impedance modulation element 231. The non-overlap control circuit 272 prevents the two MOSFETs from being simultaneously in the ON state by shifting an ON timing and an OFF timing of the two MOSFETs as illustrated.

(Phase Optimization of Wireless Power Transmitter 1)

Figure 6:
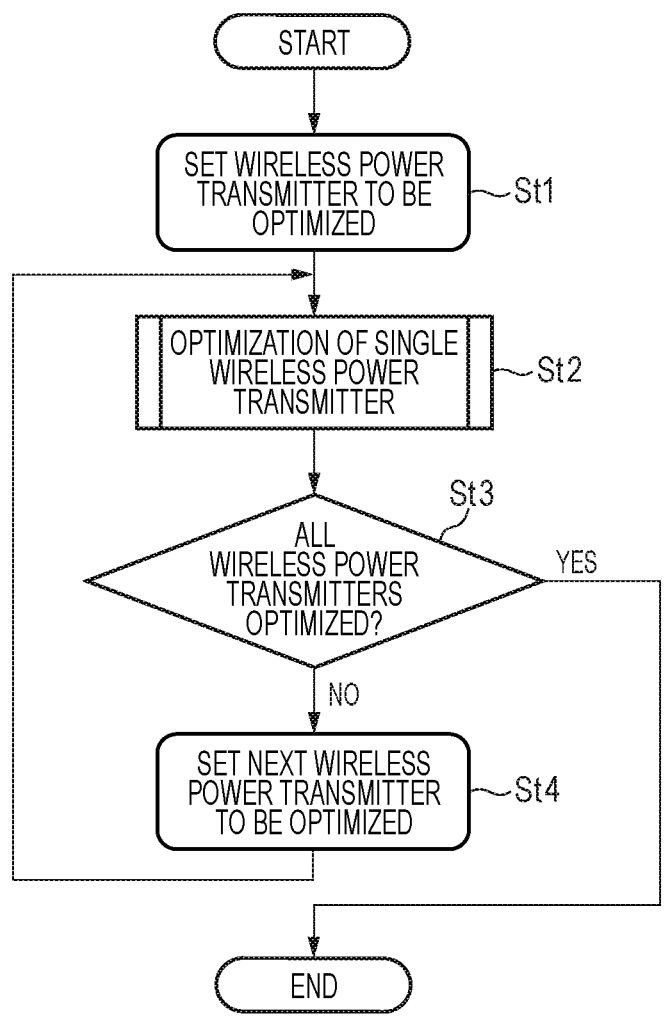
FIG. 6 is a flowchart of phase optimization of each wireless power transmitter 1.

Next, an example of processing for optimizing the phase of the radio wave transmitted from the antenna 15 (hereinafter, simply referred to as "phase optimization") in the plurality of wireless power transmitters 1 (see FIG. 3) included in the wireless power transfer system 500 will be described. FIG. 6 is a flowchart of the phase optimization of each wireless power transmitter 1.

Here, a processing subject of the phase optimization processing of each wireless power transmitter 1 may be each wireless power transmitter 1. There may be a host device such as a personal computer (PC) connected to each wireless power transmitter 1. The host device may control the phase optimization processing of each wireless power transmitter 1.

First, one wireless power transmitter 1 to be subjected to the phase optimization is set (step St1). The setting may be performed by the host device (not illustrated). On the other hand, a priority order or the like for performing the phase optimization may be determined in advance. The wireless power transmitter 1 having a highest priority order may be autonomously set, and the phase optimization processing may be started.

Next, the phase optimization processing is executed for the set one wireless power transmitter 1 (step St2). In the phase optimization processing, the control device 17 controls the phase shift circuit 13 such that the strength of the backscatter signal received by the wireless power transmitter 1 is maximized. As a result of the control of the phase shift circuit 13, the phase of the radio wave transmitted from the antenna 15 is adjusted to the optimum phase. Here, as described above with reference to FIG. 2, the substantially proportional relationship is established between the power received by the power receiving terminal 2 (received power) and the strength of the backscatter signal. Therefore, when the phase optimization processing in step St2 is performed on the wireless power transmitter 1, the received power of the power receiving terminal 2 is increased.

A more specific example of the phase optimization processing will be described later with reference to FIGS. 7 to 10. Here, the phase optimization processing used in the phase optimization processing (step St2) may be the same processing every time, or different phase optimization processing may be used every time. For example, the phase optimization processing may be performed on a certain wireless power transmitter 1 by using a hill-climbing method to be described later, and the phase optimization processing may be performed on another wireless power transmitter 1 by using a reciprocating rotation method to be described later.

When the phase optimization processing for one wireless power transmitter 1 is completed, it is determined whether the phase optimization processing for all the wireless power transmitters 1 is completed. When the phase optimization processing is completed for all the wireless power transmitters 1 (Yes in step St3), the processing ends. When there remains the wireless power transmitter 1 for which the phase optimization processing is not performed yet (No in step St3), the processing proceeds to step St4. A determination subject in step St3 may be the host device. The determination subject in step St3 may be a last remaining wireless power transmitter 1 having a low priority order when the above-described priority is determined.

In step St4, one next wireless power transmitter 1 to be subjected to the phase optimization is set. The setting may be performed by the host device (not illustrated). On the other hand, the setting may be performed by the wireless power transmitter 1 that finally completes the phase optimization processing at the time point. After step St4, the processing returns to step St2. In this manner, the wireless power transmitters 1 included in the wireless power transfer system 500 sequentially perform the phase optimization processing one by one.

As shown in the flowchart of FIG. 6, when the optimization is completed for all the wireless power transmitters 1 included in the wireless power transfer system 500, the phase optimization processing may be terminated, or the phase optimization processing may be repeated from the first wireless power transmitter 1 again. When the phase optimization processing is repeated, the optimization may be performed using optimization processing (for example, a ramp rotation method to be described later) different from the optimization processing (for example, the hill-climbing method to be described later) used before repetition.

(First Phase Optimization Processing)

Figure 7:
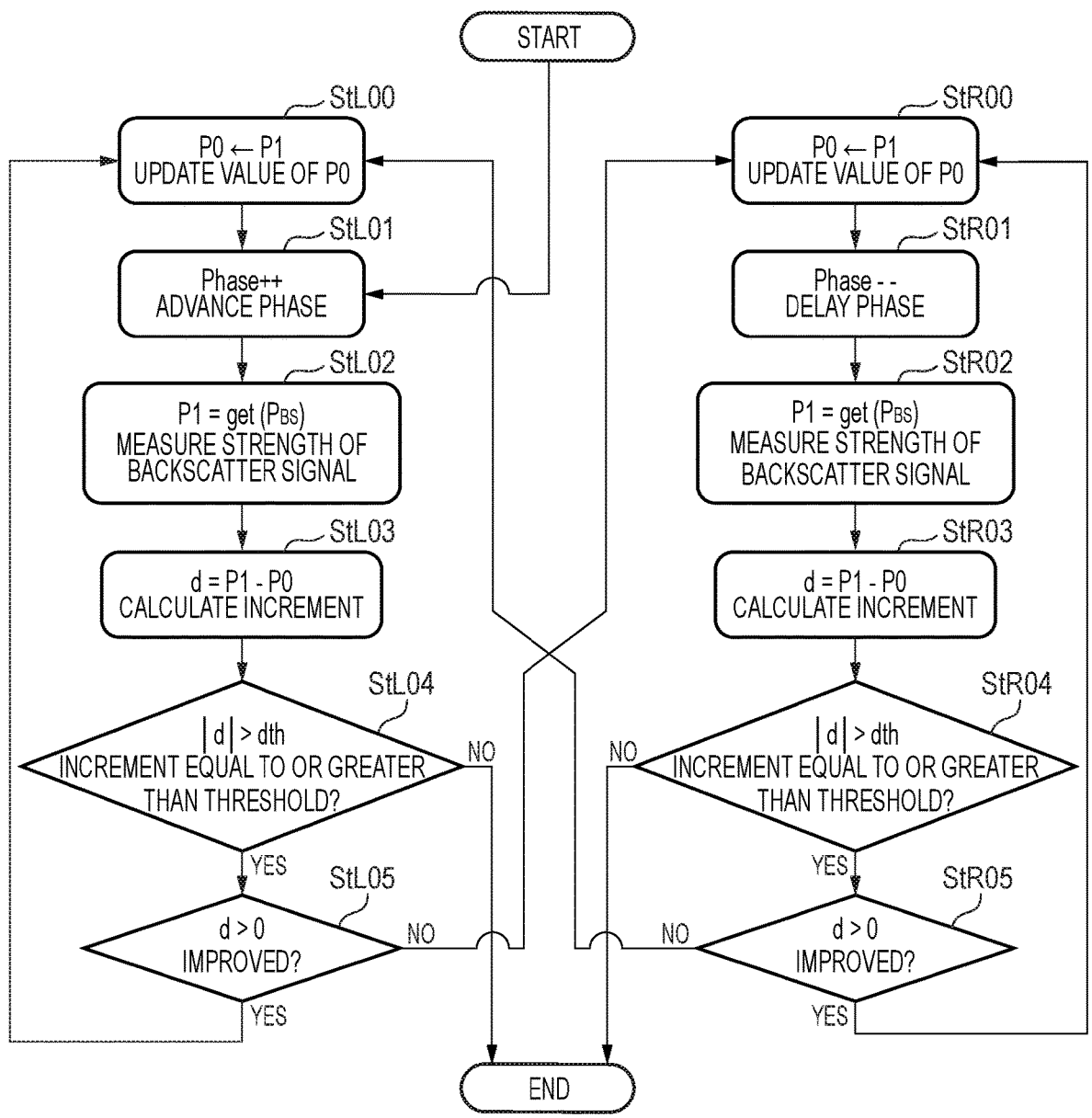
FIG. 7 is a flowchart showing first phase optimization processing.

There are a plurality of modes of the phase optimization processing in which the control device 17 of the wireless power transmitter 1 controls the phase shift circuit 13 such that the strength of the backscatter signal is maximized. FIG. 7 is a flowchart showing first phase optimization processing.

The first phase optimization processing uses an algorithm called the hill-climbing method. For example, in a two-dimensional graph in which a horizontal axis represents a set phase (0 to $2\pi$) in the phase shift circuit 13 and a vertical axis represents the strength of the backscatter signal, a peak at which the strength of the backscatter signal is maximized should be present somewhere in the phase (0 to $2\pi$). Therefore, the hill-climbing method is an algorithm that searches for a point with a peak as if climbing a mountain.

The flowchart shown in FIG. 7 shows processing for one wireless power transmitter 1, and corresponds to step St2 in FIG. 6. First, the control device 17 controls the phase shift circuit 13 to slightly advance the set phase in the phase shift circuit 13 (step StL01). A degree to which the phase is advanced at a time (a phase shift amount per time) may be determined as appropriate. Since the set phase in the phase shift circuit 13 varies, the phase of the radio wave transmitted from the antenna 15 also varies, and the backscatter signal reflected from the wireless power receiver 2 also varies. The strength of the backscatter signal after the variation is measured in the next step StL02.

The control device 17 measures the strength of the backscatter signal (step StL02).

The control device 17 calculates an increment value d=P1−P0 of the strength of the backscatter signal (step StL03). The value of the strength of the backscatter signal at the previous measurement is stored in a variable P0.

Next, the control device 17 determines whether an absolute value |d| of the increment value d exceeds a predetermined threshold dth (step StL04). When |d|>dth is satisfied (Yes in step StL04), the processing proceeds to the next step StL05. When |d|≤dth is satisfied (No in step StL04), it is determined that a change amount of the value between P1 and P0 is small and the peak of the mountain is reached, and the phase optimization processing for the wireless power transmitter 1 ends. The phase of the radio wave transmitted from the antenna 15 at the time point when the processing ends is the optimum phase obtained by the phase optimization processing.

In step StL05, the control device 17 determines whether the increment value d is greater than 0. When d>0, since the mountain is still climbing, the processing proceeds to step StL00, which is a next loop. When d≤0, the processing proceeds to step StR00 in order to reverse a shift direction of the phase toward the peak.

In step StL00, the control device 17 substitutes the value of P1 into P0, and the processing proceeds to step StL01.

The steps StL00 to StL05 for searching for the peak of the mountain while gradually advancing the set phase in the phase shift circuit 13 is described above. The same applies to steps StR00 to StR05 on a right side of the flowchart. One difference is that the control device 17 delays the set phase in the phase shift circuit 13 in step StR01. That is, in steps StL00 to StL05, the peak is searched while increasing the value of the set phase in the phase shift circuit 13 (in a direction from 0 to 2π), and in steps StR00 to StR05, the peak is searched while decreasing the value of the set phase in the phase shift circuit 13 (in a direction from 2π to 0).

As described above, the control device 17 can perform the phase optimization by controlling the phase shift circuit 13 using the hill-climbing method.

(Second Phase Optimization Processing)

Next, second phase optimization processing will be described with reference to FIG. 8. The second phase optimization processing is also processing for one wireless power transmitter 1, and corresponds to step St2 in FIG. 6.

In the present specification, an algorithm used in the second phase optimization processing is expressed as the "ramp rotation method". An outline of the lamp rotation method is as follows. For example, in the two-dimensional graph in which the horizontal axis represents the set phase (0 to 2π) in the phase shift circuit 13 and the vertical axis represents the strength of the backscatter signal, the peak at which the strength of the backscatter signal is maximized should be present somewhere in the phase (0 to 2π). Therefore, the set phase in the phase shift circuit 13 is rotated by one rotation with reference to a predetermined start time, a time (peak time) at which the strength of the backscatter signal becomes maximum is acquired, and the control device 17 specifies the optimum phase for the phase shift circuit 13 (and, incidentally, the optimum phase of the radio wave transmitted from the antenna 15) from a difference between the peak time and the start time. A rotation direction of the set phase in the phase shift circuit 13 may be a direction in which the phase increases or a direction in which the phase decreases.

Figure 8:
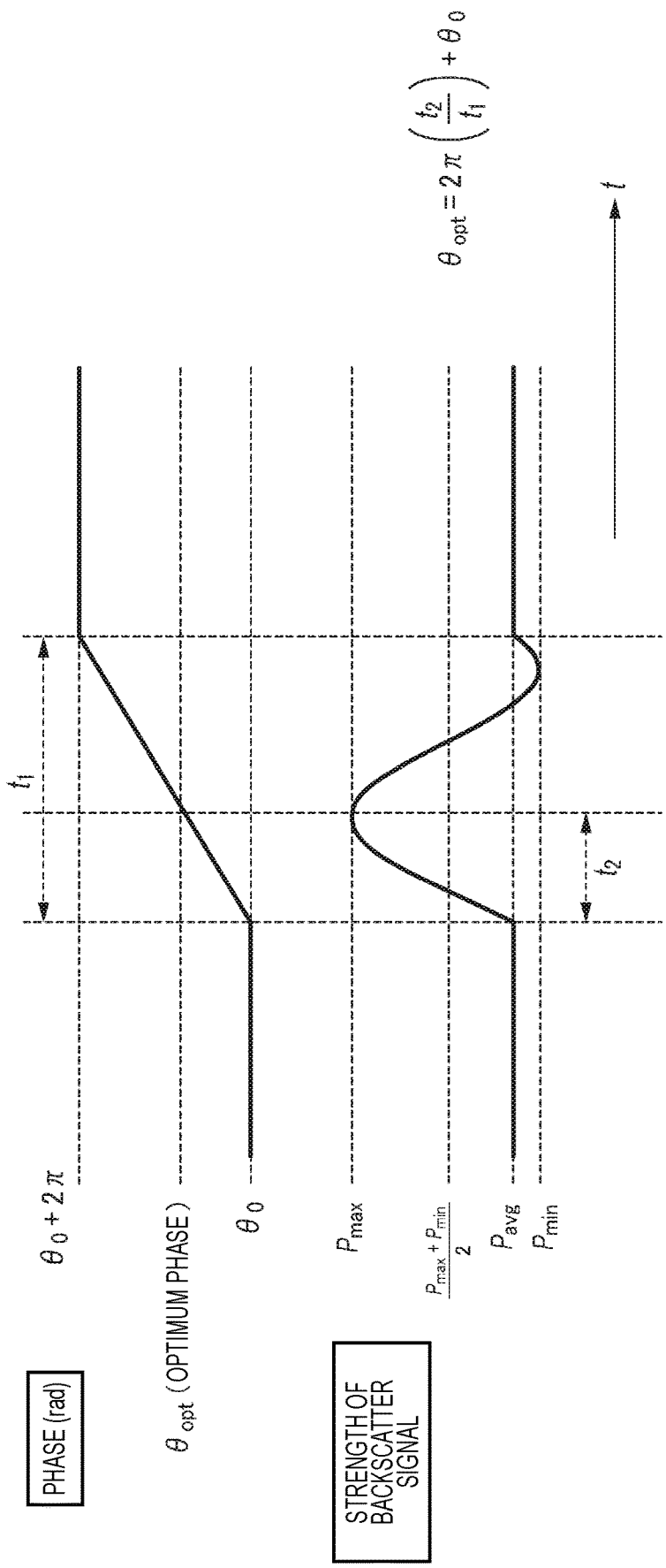
FIG. 8 is a conceptual diagram showing an example of a lamp rotation method.

FIG. 8 is a conceptual diagram showing an example of the lamp rotation method. A thick polygonal line drawn on an upper side in FIG. 8 indicates the set phase in the phase shift circuit 13. The horizontal axis represents a time t (unit: second), and the vertical axis represents the phase (unit: radian). In the example, a case where the rotation direction of the set phase in the phase shift circuit 13 is the direction in which the phase increases will be described.

A wavy line drawn on a lower side in FIG. 8 indicates the strength of the backscatter signal acquired by the control device 17. The horizontal axis represents the time t (unit: second), and the vertical axis represents strength P (unit: dBm) of the backscatter signal.

Here, an initial value of the set phase in the phase shift circuit 13 (the set phase at a certain time point of the phase shift circuit 13) is $\theta_0$ radians. From the start time t=0, the control device 17 controls the phase shift circuit 13 to rotate the set phase in the phase shift circuit 13 by one rotation from $\theta_0$ radian to $\theta_0+2\pi$ radian. That is, the control device 17 linearly monotonically increases the set phase of the phase shift circuit 13 by 2π with reference to the set phase $\theta_0$ at a certain time point of the phase shift circuit 13. When the rotation direction in one rotation of the set phase is reversed (one rotation from $\theta_0$ radian to $\theta_0-2\pi$ radian), the control device 17 linearly monotonically decreases the set phase of the phase shift circuit 13 by 2π with reference to the set phase $\theta_0$ at a certain time point of the phase shift circuit 13.

The time at which one rotation of the set phase in the phase shift circuit 13 (linear monotonic increase or linear monotonic decrease by 2π) ends is the time $t=t_1$. Since one rotation of the set phase in the phase shift circuit 13 is performed under the control of the control device 17, the time $t=t_1$ is a value known to the control device 17.

Between time t=0 and time $t=t_1$, there is a time at which the strength P of the backscatter signal has a maximum value (peak). At this time, the time is assumed to be $t=t_2$. The time $t=t_2$ corresponds to a time from the start time t=0 at which one rotation of the set phase in the phase shift circuit 13 is performed until the strength of the backscatter signal received by the wireless power transmitter 1 becomes maximum. The control device 17 can continuously acquire the backscatter signal from the backscatter signal receiver 16 and acquire the value at a time $t=t_2$. Then, the control device 17 executes the phase optimization processing using the time $t=t_2$ until the strength of the backscatter signal received by the wireless power transmitter 1 becomes maximum. For example, the following is performed.

It is assumed that the above-described phase rotation is performed at a constant speed of 2π radians between the time t=0 and the time $t=t_1$. Then, a value of at an optimum phase $\theta_{opt}$ in the phase shift circuit 13 at the time $t=t_2$ can be obtained by the following formula.

$$\theta_{opt} = 2\pi\left(\frac{t_2}{t_1}\right) + \theta_0 \qquad \text{[Formula 1]}$$

That is, in the second phase optimization processing using the ramp rotation method, the control device 17 performs the following processing. First, a rotation start time (time t=0) is determined, and the phase shift circuit 13 is controlled to make one rotation of the set phase in the phase shift circuit 13 from $\theta_0$ radian to $\theta_0+2\pi$ radian (in the case of making one rotation in the direction in which the phase decreases, one rotation from $\theta_0$ radian to $\theta_0-2\pi$ radian). The control device 17 acquires the time t=$t_1$ at the end of the rotation (a known value). Then, the control device 17 continuously acquires the backscatter signal from the backscatter signal receiver 16, and acquires the time t=$t_2$ at which the signal strength is maximum. The control device 17 calculates the value of the optimum phase $\theta_{opt}$ in the phase shift circuit 13 based on the above formula using the acquired parameters $t_1$, $t_2$, and $\theta_0$. Then, finally, the control device 17 controls the phase shift circuit 13 to adjust the set phase in the phase shift circuit 13 to $\theta_{opt}$. As described above, the control device 17 can perform the second phase optimization processing.

The second phase optimization processing based on the ramp rotation method has an advantage in that, as compared with the first phase optimization processing based on the hill-climbing method, phase control for the phase shift circuit 13 can be reduced. This is because the hill-climbing method performs information processing in which the optimum phase is continuously searched while shifting the set phase several times little by little, whereas the ramp rotation method can obtain the optimum phase when the set phase is rotated once. However, which optimization processing is preferably used finally depends on a condition when the wireless power transmitter 1 is mounted.

(Third Phase Optimization Processing)

Next, third phase optimization processing will be described with reference to FIG. 9. The third phase optimization processing is also processing for one wireless power transmitter 1, and corresponds to step St2 in FIG. 6.

In the present specification, an algorithm used in the third phase optimization processing is expressed as the "reciprocating rotation method". The outline of the reciprocating rotation method is as follows. For example, in the two-dimensional graph in which the horizontal axis represents the set phase (0 to $2\pi$) in the phase shift circuit 13 and the vertical axis represents the strength of the backscatter signal, the peak at which the strength of the backscatter signal is maximized should be present somewhere in the phase (0 to $2\pi$). Here, in the case of the above-described lamp rotation method, a delay until the phase shift circuit 13 is controlled or a time delay until the backscatter signal is acquired from the wireless power receiver 2 at a distant position becomes an error factor when the optimum phase $\theta_{opt}$ in the phase shift circuit 13 is calculated. Therefore, in the reciprocating rotation method, the set phase in the phase shift circuit 13 is rotated to reciprocate twice so as to reduce an error. Then, since one peak can be detected for one phase rotation (see the lamp rotation method), two peaks can be detected by two phase rotations. The control device 17 calculates the optimum phase $\theta_{opt}$ in the phase shift circuit 13 based on a time difference between the two peaks.

Figure 9:
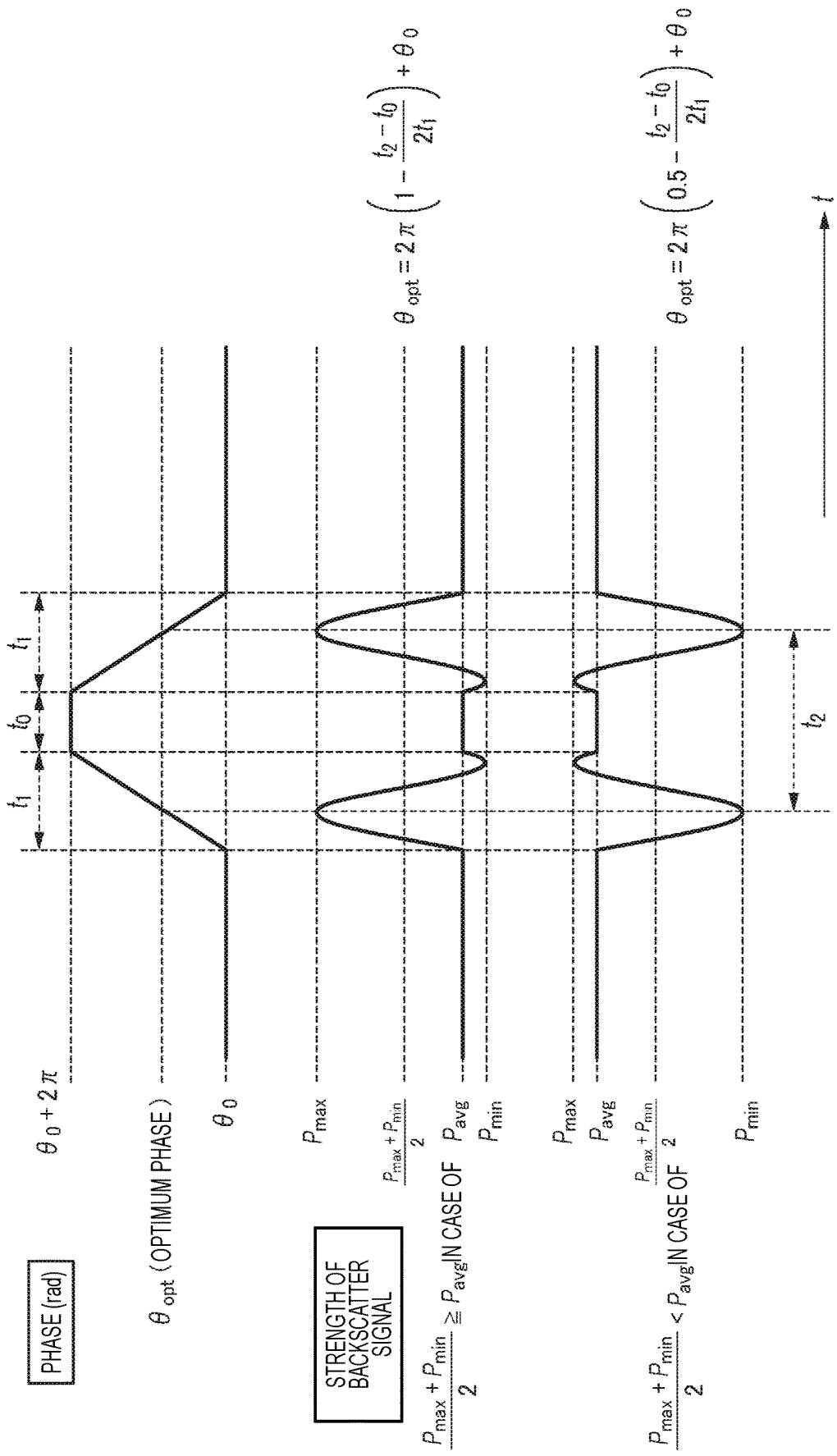
FIG. 9 is a conceptual diagram showing an example of a reciprocating rotation method.

FIG. 9 is a conceptual diagram showing an example of the reciprocating rotation method. A trapezoidal polygonal line drawn on an upper side in FIG. 9 indicates the set phase in the phase shift circuit 13. The horizontal axis represents the time t (unit: second), and the vertical axis represents the phase (unit: radian).

The wavy line drawn on a lower side in FIG. 9 indicates the strength of the backscatter signal acquired by the control device 17. The horizontal axis represents the time t (unit: second), and the vertical axis represents strength P (unit: dBm) of the backscatter signal.

First, similarly to the above-described lamp rotation method, the control device 17 controls the phase shift circuit 13 to rotate the set phase in the phase shift circuit 13 by one rotation from $\theta_0$ radian to $\theta_0+2\pi$ radian. That is, the control device 17 linearly monotonically increases the set phase of the phase shift circuit 13 by $2\pi$ with reference to the set phase $\theta_0$ at a certain time point of the phase shift circuit 13. In the case of mounting in which the rotation direction in one rotation of the set phase is reversed (one rotation from $\theta_0$ radian to $\theta_0-2\pi$ radian), the control device 17 linearly monotonically decreases the set phase of the phase shift circuit 13 by $2\pi$ with reference to the set phase $\theta_0$ at a certain time point of the phase shift circuit 13.

Thereafter, the set phase is not changed for a predetermined time ($t_0$ seconds).

Then, the control device 17 linearly varies (monotonically decreases or monotonically increases) the set phase of the phase shift circuit 13 by $2\pi$ in a direction opposite to the monotonically increase or monotonically decrease. That is, the control device 17 controls the phase shift circuit 13 to reversely rotate the set phase in the phase shift circuit 13 from $\theta_0+2\pi$ radians ($\theta_0-2\pi$ radians in the case of mounting in which the rotation direction of the set phase is reversed) to $\theta_0$ radians. The upper graph in FIG. 9 showing the phase change as a result of the two rotations shows a trapezoidal shape.

When the phase rotation is performed twice as described above, a moment at which the strength P of the backscatter signal is a maximum value (peak) or a minimum value (negative peak) appears twice. As shown in the lower graph in FIG. 9, two large mountains can be formed. The two large upward mountains are peaks, and two large downward mountains are negative peaks.

Which of the peak and the negative peak should be used is classified into cases using a maximum value $P_{max}$ of the strength P, a minimum value $P_{min}$ of the strength P, and an average value $P_{avg}$ of the strength P. Here, the average value $P_{avg}$ is equal to the value of the strength P at an intermediate time between the two peaks. When $(P_{max}+P_{min})/2 \geq P_{avg}$ is satisfied, the peak is used. When $(P_{max}+P_{min})/2 < P_{avg}$, the negative peak is used.

Therefore, the control device 17 calculates a difference $t_2$ between a time at which a first peak (or a first negative peak) is detected and a time at which a second peak (or a second negative peak) is detected. The control device 17 can continuously acquire the backscatter signal from the backscatter signal receiver 16 and acquire the time at which the peak (or negative peak) is detected. The time difference $t_2$ is a relative value of the time at which the strength of the backscatter signal received by the wireless power transmitter 1 is the maximum (peak) or the minimum (negative peak). Then, the control device 17 executes the phase optimization processing by using the relative value. For example, the following is performed.

The optimum phase $\theta_{opt}$ in the phase shift circuit 13 can be calculated by the following formula.

[Formula 2]

$$\text{IN CASE OF } \frac{P_{max}+P_{min}}{2} \geq P_{avg}: \theta_{opt} = 2\pi\left(1 - \frac{t_2 - t_0}{2t_1}\right) + \theta_0$$

$$\text{IN CASE OF } \frac{P_{max}+P_{min}}{2} < P_{avg}: \theta_{opt} = 2\pi\left(0.5 - \frac{t_2 - t_0}{2t_1}\right) + \theta_0$$

The control device 17 calculates the optimum phase $\theta_{opt}$ in the phase shift circuit 13 based on the four parameters $\theta_0$, $t_0$, $t_1$, and $t_2$ in the above two formulas. Then, the control device 17 controls the phase shift circuit 13 to adjust the set phase in the phase shift circuit 13 to $\theta_{opt}$. As described above, the control device 17 can perform the third phase optimization processing.

Since the trapezoidal phase variation shown in the upper graph in FIG. 9 is generated by the control device 17 controlling the phase shift circuit 13, $\theta_0$, $t_0$, and $t_1$ are known to the control device 17. As described above, $t_2$ may be calculated by the control device 17. In the example in FIG. 9, the rotation direction of the set phase in the phase shift circuit 13 is one rotation in the direction in which the phase increases and then one rotation in the direction in which the phase decreases. However, after one rotation in the direction in which the phase decreases, one rotation in the direction in which the phase increases may be performed.

In the third phase optimization processing based on the reciprocating rotation method as described above, since the value to be acquired is only the time difference $t_2$ between the two peaks, the delay until the control of the phase shift circuit 13 is performed or the time delay until the backscatter signal is acquired from the wireless power receiver 2 at the distant position does not become the error factor when calculating the optimum phase $\theta_{opt}$ in the phase shift circuit 13. Therefore, the optimum phase $\theta_{opt}$ in the phase shift circuit 13 can be calculated with high accuracy. However, which optimization processing is preferably used finally depends on a condition when the wireless power transmitter 1 is mounted.

(Phase Optimization One by One)

Figure 10:
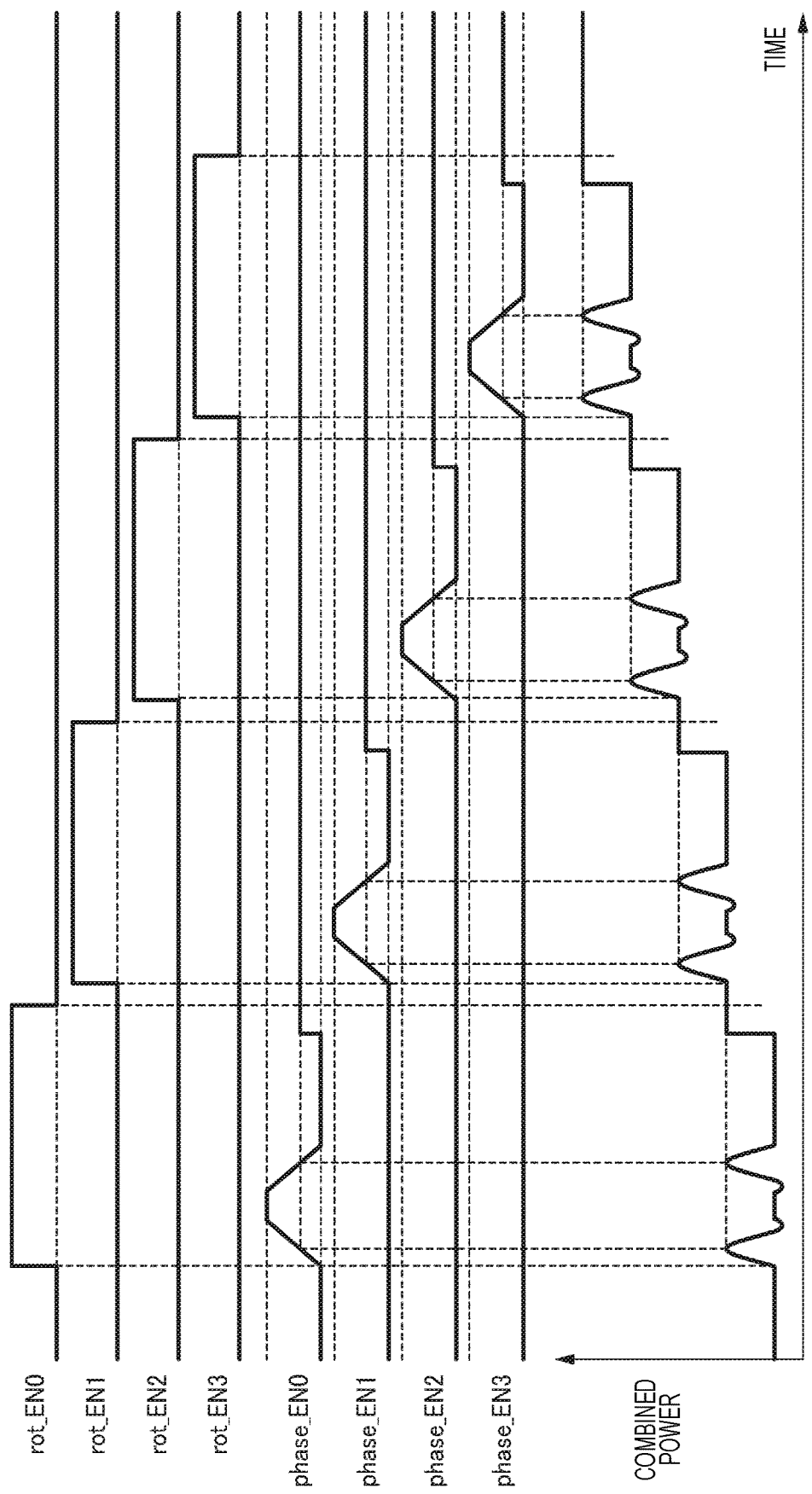
FIG. 10 is a conceptual diagram showing combined power (received power) received by the wireless power receiver 2 when a plurality of wireless power transmitters 1 are sequentially phase-optimized one by one.

FIG. 10 is a conceptual diagram showing the combined power (received power) received by the wireless power receiver 2 when the plurality of wireless power transmitters 1 are sequentially phase-optimized one by one. In the example in FIG. 10, the phase optimization is sequentially performed one by one for four wireless power transmitters EN0, EN1, EN2, and EN3 (see the flowchart in FIG. 6). Every time the wireless power transmitters EN0, EN1, EN2, and EN3 complete the phase optimization processing, the received power (the vertical axis of the graph in the lower part in FIG. 10) increases in a stepwise manner with time (the horizontal axis of the graph in the lower part in FIG. 10).

In the example in FIG. 10, all of the four wireless power transmitters execute the phase optimization using the third phase optimization processing. However, even when the four wireless power transmitters use the first or second phase optimization processing or when the plurality of kinds of phase optimization processing are mixed and used, the plurality of wireless power transmitters 1 are sequentially phase-optimized one by one. This is because when the phase optimization processing is simultaneously performed on the plurality of wireless power transmitters 1 (for example, EN0 and EN1), the effect generated from each of the plurality of phase optimization processing is mixed in the variation of the combined power (and the strength of the backscatter signal), and thus the optimum phase $\theta_{opt}$ in the phase shift circuit 13 cannot be correctly specified.

(Experimental Example of Frequency Synchronization)

Figure 11:
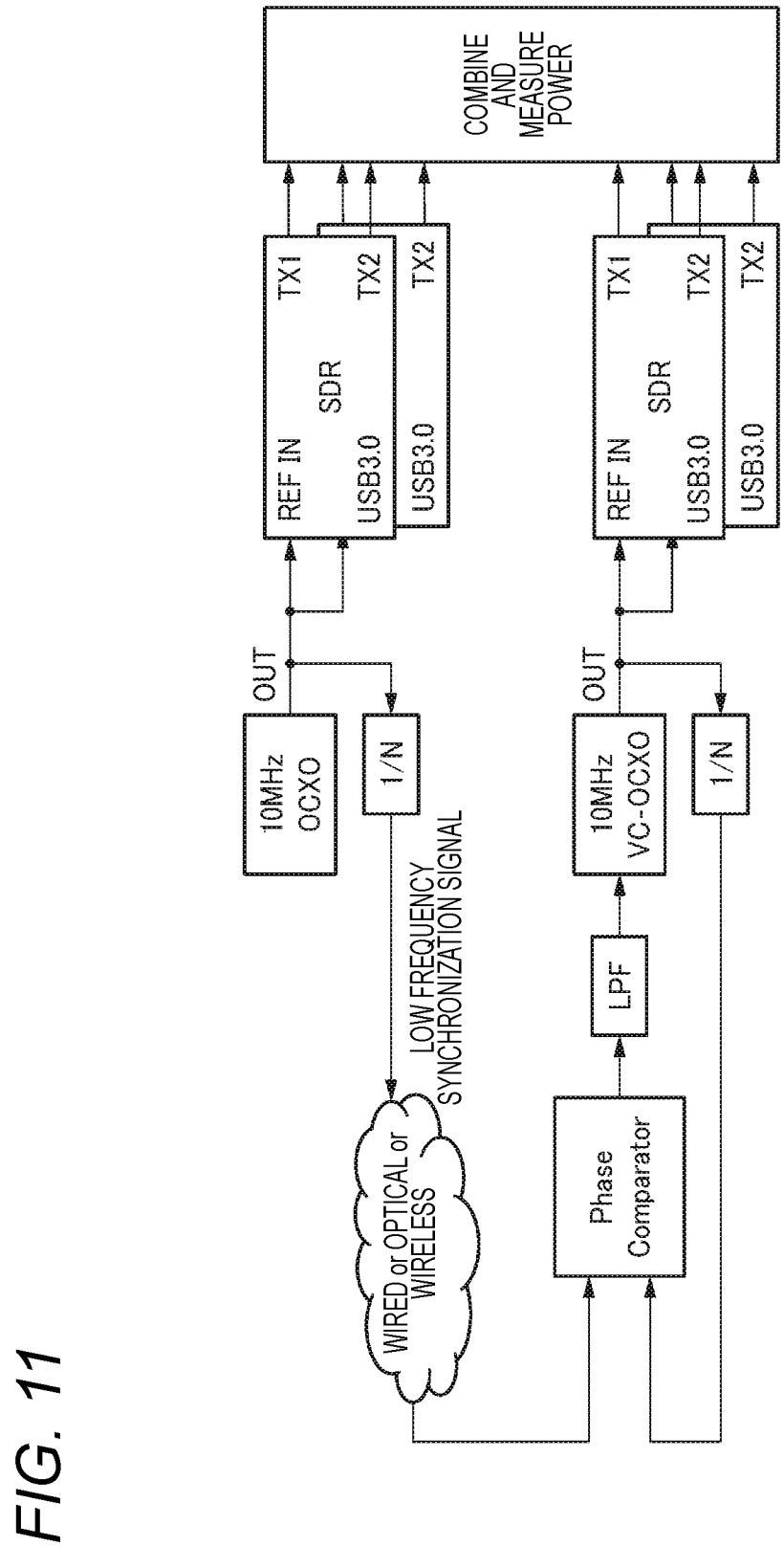
FIG. 11 is a block diagram showing an experimental example of frequency synchronization processing among the plurality of wireless power transmitters 1.

FIG. 11 is a block diagram showing an experimental example of frequency synchronization processing among the plurality of wireless power transmitters 1. As illustrated, an experiment was performed in which a plurality of devices SDR corresponding to the wireless power transmitter 1 were provided, the power transmitted from a plurality of transmitters (TX1 and TX2) included in the device SDR was combined, and the combined power was measured.

In FIG. 11, a clock having a reference frequency of 10 MHz was output from a crystal oscillator (OCXO). The clock was input to a phase comparator through wired transfer, optical transfer, or wireless transfer in a state of being set to a low frequency of 1 MHz by using a frequency divider (1/10). The phase comparator, a loop filter (LPF), a 10 MHz crystal oscillator (VC-OCXO), and the frequency divider (1/N) form a phase synchronization loop (PLL). Using the phase synchronization loop, the low frequency of 1 MHz was multiplied to 10 MHz and input to the device SDR corresponding to the wireless power transmitter 1. In this way, it was confirmed that frequency synchronization can be performed among the plurality of devices SDR connected by wire connection, optical connection, or wireless connection.

(Experimental Example of Frequency Synchronization when Infrared Communication is Used)

Figure 12:
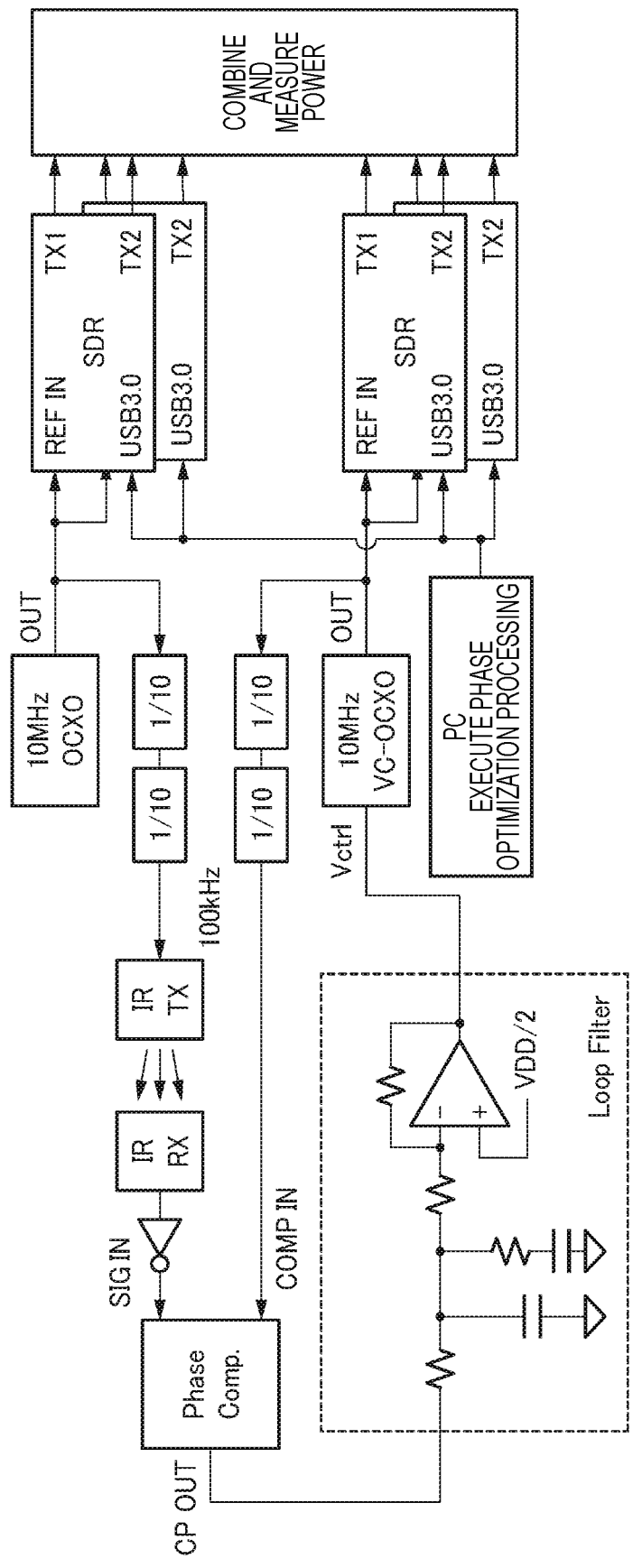
FIG. 12 is a block diagram showing the experimental example of the frequency synchronization processing among the plurality of wireless power transmitters.

FIG. 12 is a block diagram showing the experimental example of the frequency synchronization processing among the plurality of wireless power transmitters. The block configuration in the experimental example shown in FIG. 12 is substantially the same as the block configuration in the experimental example shown in FIG. 11.

In the experimental example shown in FIG. 12, the sharing of the clock among the devices SDR is performed through infrared (IR) communication between an IR transmitter (IRTX) and an IR receiver (IRRX). Since a response speed of an LED included in the IR transmitter and a photodiode included in the IR receiver is about 1 MHz, the clock having the reference frequency of 10 MHz generated by the oscillator VC-OCXO cannot be transferred as it is. Therefore, in the present experimental example, the clock (100 kHz) whose frequency is reduced to 1/100 by using the frequency divider (1/10 is two) is transferred from the IR transmitter and shared. The clock of 100 kHz is multiplied to 10 MHz by the PLL and input to the device SDR.

A personal computer (PC) as the host device is connected to a preceding stage of each device SDR. A general control unit normally included in the PC sequentially executes the phase optimization processing in each device SDR one by one, and measures the combined power. As a result of the experiment, it was confirmed that there is no problem in the frequency synchronization among the plurality of wireless power transmitters even when a low frequency clock of about 100 kHz through the infrared communication is used. In the method, the synchronization of the phases between the devices SDR cannot be performed by the infrared communication. However, since the PC, which is the host device connected to each device SDR, executes the phase optimization processing using the hill-climbing method, the ramp rotation method, the reciprocating rotation method, or the like described above, phase shift at the time point of the infrared communication does not become a problem.

(Experimental Example of Position where Backscatter Signal is Modulated)

Figure 13:
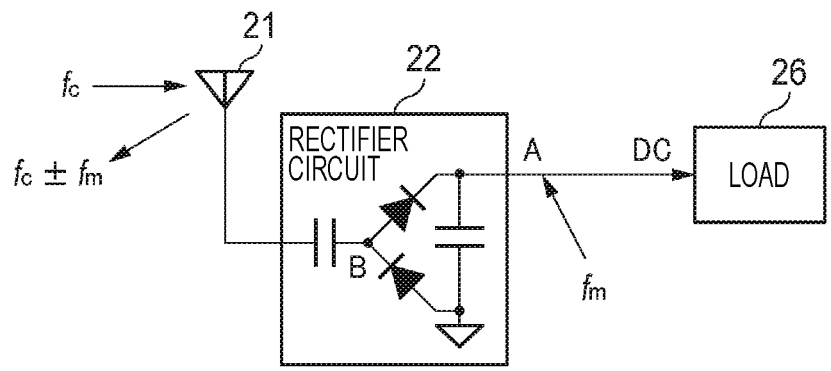
FIG. 13 is a conceptual diagram showing an experimental example of a position where a backscatter signal is modulated.
Figure 14:
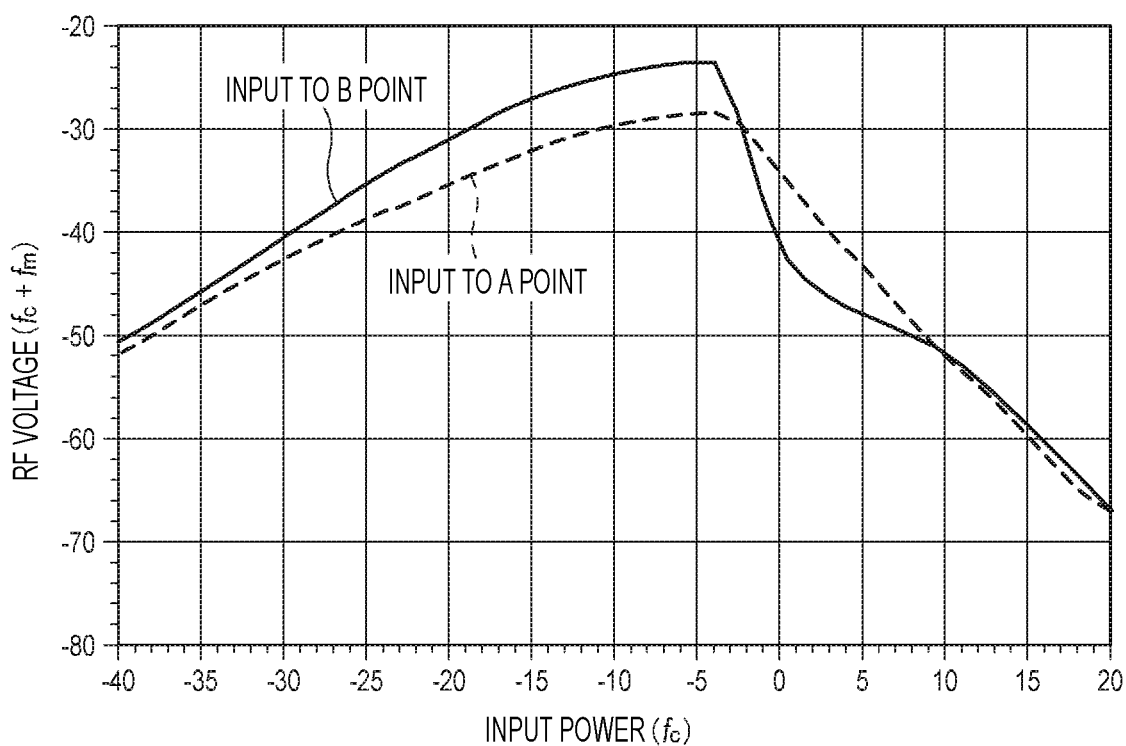
FIG. 14 is a diagram showing a relationship between input power and an RF voltage in the experimental example in FIG. 13.

FIG. 13 is a conceptual diagram showing an experimental example of a position where the backscatter signal is modulated. FIG. 14 is a diagram (graph) showing a relationship between the input power and the RF voltage in the experimental example in FIG. 13. As described above, the antenna 21 of the wireless power receiver 2 receives the radio wave of a frequency fc (for example, 920 MHz) ("input power" in the graph), and reflects the backscatter modulated to a frequency fc±fm ("RF voltage" in the graph). A frequency fm related to the modulation is input to a point A which is at a subsequent stage of the rectifier circuit 22 and a point B which is in the inside of the rectifier circuit 22, and the relationship between the input power and the RF voltage is graphed.

The horizontal axis of the graph shown in FIG. 14 represents the input power, and the vertical axis represents the strength of the backscatter signal. The unit of each of the horizontal axis and the vertical axis is dBm. For example, when the input power (received power) of −20 dBm is input to the antenna 21 of the wireless power receiver 2, a backscatter signal having a strength of −35 dBm is emitted (reflected) at the point A. As can be seen from the graph, when the frequency fm related to the modulation is input to the point A, it can be seen that the frequency fm linearly changes (monotonically increases) in a wide band on the graph. That is, the strength of the backscatter signal and a received power strength are substantially proportional to each other. Therefore, the wireless power transmitter 1 can perform the above-described phase optimization processing using the strength of the backscatter signal instead of the received power strength.

As described above, the control device included in the wireless power transmitter may perform the phase optimization processing using the hill-climbing method. Accordingly, the phase shift circuit is controlled so that the strength of the backscatter signal is maximized, and the received power of the wireless power receiver can be improved.

The control device included in the wireless power transmitter may linearly monotonically increase or monotonically decrease the set phase of the phase shift circuit included in the wireless power transmitter by $2\pi$ with reference to the set phase at the certain time point of the phase shift circuit, and may execute the phase optimization processing using a time until the strength of the backscatter signal received by the wireless power transmitter becomes maximum. Accordingly, the received power of the wireless power receiver can be improved, and phase control for the phase shift circuit can be reduced as compared with the above-described hill-climbing method.

The control device included in the wireless power transmitter may linearly monotonically increase or monotonically decrease the set phase of the phase shift circuit included in the wireless power transmitter by $2\pi$ with reference to the set phase at the certain time point of the phase shift circuit, then linearly vary the set phase of the phase shift circuit by $2\pi$ in a direction opposite to the monotonically increase or monotonically decrease, and execute the phase optimization processing using a relative value of a time at which the strength of the backscatter signal received by the wireless power transmitter is maximum or minimum. Accordingly, the received power of the wireless power receiver can be improved, and the optimum phase $\theta_{opt}$ in the phase shift circuit 13 can be calculated with high accuracy.

The wireless power transmitter may include a frequency multiplier that multiplies the reference frequency signal. The antenna of the wireless power transmitter may transmit the radio wave multiplied by the frequency multiplier. Accordingly, wiring between the wireless power transmitters can be reduced in cost.

The wireless power transmitter may include the reference frequency oscillator that oscillates the reference frequency signal. Then, the signal oscillated by the reference frequency oscillator may be input to the frequency multiplier. Accordingly, the oscillated reference frequency signal can be multiplied by the frequency multiplier.

The wireless power transmitter may include the output unit that outputs the signal oscillated by the reference frequency oscillator to the outside, and the input unit to which the reference frequency signal is input. Then, the signal oscillated by the reference frequency oscillator may be shared among the plurality of wireless power transmitters. Accordingly, it is not necessary for all the wireless power transmitters to oscillate the reference frequency signal, and the configurations of the wireless power transmitters and the wireless power transfer system can be made slim.

In the wireless power receiver, the backscatter modulation circuit may include the oscillation circuit and the waveform shaping circuit. The waveform shaping circuit may shape the waveform of the clock input from the oscillation circuit into a waveform having the lower duty ratio and input the waveform to the impedance modulation element. Accordingly, the power loss of the wireless power receiver can be reduced.

The wireless power transmitters included in the wireless power transfer system may sequentially execute the phase optimization processing one by one. Accordingly, it is possible to avoid a problem caused by the plurality of wireless power transmitters simultaneously executing the phase optimization processing.

Although various embodiments have been described above with reference to the drawings, it is needless to say that the present disclosure is not limited thereto. It will be apparent to those skilled in the art that various changes and modifications can be conceived within the scope of the claims, and it is also understood that the various changes and modifications belong to the technical scope of the present disclosure. Further, the respective constituent elements in the above-described embodiments may be optionally combined within a range not departing from the gist of the present disclosure.

What is claimed is:

1. A wireless power transfer system comprising:
a first wireless power transmitter; and
a second wireless power transmitter; and
at least one backscatter signal receiver configured to receive a backscatter signal from a wireless power receiver,
wherein the first wireless power transmitter comprises:
a first antenna configured to transmit a first radio wave;
a phase shift circuit configured to change a phase of the radio wave transmitted from the first antenna; and
a first control device configured to control the phase shift circuit; and
wherein the second wireless power transmitter comprises:
a second antenna configured to transmit a second radio wave;
a second phase shift circuit configured to change a phase of the second radio wave; and
a second control device configured to control the second phase shift circuit,
wherein the backscatter signal is modulated by the wireless power receiver according to a radio wave received by the wireless power receiver; and
wherein the first control device is configured to execute phase optimization processing of controlling the first phase shift circuit so that a strength of the backscatter signal received by the at least one backscatter signal receiver is maximized,
wherein the second control device is configured to execute phase optimization processing of controlling the second phase shift circuit so that a strength of the backscatter signal is maximized, and wherein the first control device and the second control device are configured to sequentially perform phase optimization processing one by one, and the phase optimization processing is performed according to: control of a host device connected to the first wireless power transmitter and second wireless power transmitter, or predetermined priorities of the first wireless power transmitter and second wireless power transmitter.

2. The wireless power transfer system according to claim 1, wherein the first control device or the second control device is configured to execute the phase optimization processing using a hill-climbing method.

3. The wireless power transfer system according to claim 1, wherein the first control device or the second control device is configured to linearly and monotonically increase or linearly and monotonically decrease a set phase of the phase shift circuit of the corresponding wireless power transmitter by $2\pi$ with reference to a set phase at a certain time point of the phase shift circuit, and execute the phase optimization processing using a time until the strength of the backscatter signal becomes maximum.

4. The wireless power transfer system according to claim 1, wherein the first control device or the second control device is configured to linearly and monotonically increase or linearly and monotonically decrease a set phase of the phase shift circuit of the corresponding wireless power transmitter by $2\pi$ with reference to a set phase at a certain time point of the phase shift circuit, then linearly vary the set phase of the phase shift circuit by $2\pi$ in a direction opposite to the monotonically increase or the monotonically decrease, and execute the phase optimization processing using a relative value of a time at which the strength of the backscatter signal becomes maximum or minimum.

5. The wireless power transfer system according to claim 1, wherein the first wireless power transmitter further comprises:

a first reference frequency oscillator configured to oscillate a reference frequency signal; and a first frequency multiplier configured to multiply a reference frequency signal, and wherein the first antenna is configured to transmit the first radio wave multiplied by the first frequency multiplier.

6. The wireless power transfer system according to claim 5, wherein the second wireless power transmitter further comprises: a second frequency multiplier configured to multiply the reference frequency signal, and the second antenna is configured to transmit the second radio wave.

7. The wireless power transfer system according to claim 6, wherein the first wireless power transmitter and the second wireless power transmitter are connected to each other in a wired or a wireless manner, and the reference frequency signal is shared among the first wireless power transmitter and the second wireless power transmitter.

8. The wireless power transfer system according to claim 1, wherein the first antenna is a circularly polarized antenna.

9. The wireless power transfer system according to claim 1, wherein when the phase optimization processing of the first controller and the second controller is performed in accordance with predetermined priorities set for the first wireless power transmitter and second wireless power transmitter:

(1) when the first wireless power transmitter has the lowest priority, the first controller is configured to determine whether the phase optimization processing has been completed for the first wireless power transmitter and the second wireless power transmitter, and (2) when the second wireless power transmitter has the lowest priority, the second controller is configured to determine whether the phase optimization processing has been completed for the first wireless power transmitter and the second wireless power transmitter.

10. The wireless power transfer system according to claim 1, wherein the at least one backscatter signal receiver is in the first wireless power transmitter.

* * * * *